Patented Sept. 13, 1949

2,481,573

UNITED STATES PATENT OFFICE 2,481,573

SUBSTITUTED PYRIDINE COMPOUNDS

Harry W. Coover and Norman J. Bowman, Rochester, N. Y., assignors to Merck & Co., Inc., Rahway, N. J., a corporation of New Jersey No Drawing. Application July 11, 1945,
Serial No. 604,536

8 Claims. (Cl. 260—297.5)

1

This invention relates to substituted 2-pyridones containing in particular a substituent in the 5 position.

The condensation of 1,3-dicarbonyl compounds with cyanoacetamide and ethyl cyanoacetate is well known and leads in the former case to 4,6-substituted-3-cyano-2-pyridones. The synthesis of certain important biologically active compounds utilizes condensations of this type. The synthesis of pyridoxin for example, involves as its first step the condensation of alkoxy acetylacetone with cyanoacetamide to give 6-methyl-4-alkoxy-3-cyano-2-pyridone. Pyridoxin contains a hydroxyl group in the 5-position and it is necessary to nitrate the condensation product, reduce the nitro group to an amino group followed by diazotization and hydrolysis.

We have discovered a new condensation which avoids these three steps. We found that it is possible to carry out the condensation with cyanoacetamide or ethyl cyanoacetate and a reagent substituted in such a manner that the resulting product, pyridone, will contain in the 5-position either the desired group or one which can be readily converted into such a group.

To achieve this desired result, we condense 1,3-dicarbonyl compounds containing a further substituent in the 2 position, with cyanoacetamide and ethylcyanoacetate. The condensation product then contains the substituent originally in the 2 position of the 1,3-dicarbonyl compound in the 5 position of the 2-pyridone.

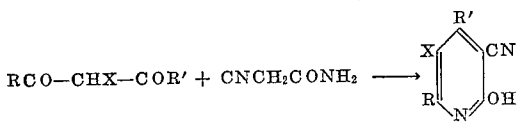

For example, 3-acetoxy-pentanedione-2,4 condensed with cyanoactamide gives 4,6-dimethyl-5-acetoxy-2-pyridone. This is readily hydrolyzed to the 5-hydroxy derivative. Similar condensations can be carried out with ethyl cyanoacetate instead of cyanoacetamide.

As 1,3-dicarbonyl compounds such derivatives as acetyl acetone, alkoxy acetylacetone, acetopyruvic esters and acetoacetic esters may be mentioned. In the case of acetoacetic esters, the mechanism is different in that ethyl alcohol is split out rather than water so that there will

2 be a hydroxyl group in the 4 position rather than a R group.

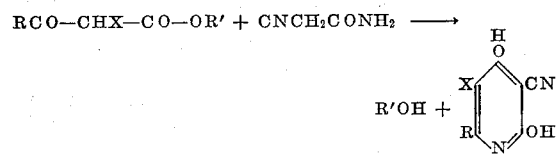

As required substituents in the 2 position of the above 1,3-dicarbonyl compounds such groups as halogen, hydroxyl, alkoxyl, acetoxy, cyano, alkyl, carboxyesters, etc., may be used.

The 2-acetoxy-1,3-dicarbonyl compounds are readily prepared by the action of potassium acetate and acetic acid under anhydrous conditions on 2-chloro-1,3-dicarbonyl compound. The chloro dicarbonyl compounds are prepared readily by the action of sulfuryl chloride on the 1,3-dicarbonyl compound. This method has been used successfully on such different types as acetylacetone, methoxy-acetylacetone, acetoacetic esters and acetopyruvic esters. The yield of chloro compound is good in all cases, but with methoxy-acetylacetone and particularly with acetopyruvic esters, the yields of the acetoxy compound are much lower than in the other cases.

The hydroxyl group in the 2 position of these condensation products can be removed by converting to the chloro derivative using $PCl_5$ in $POCl_3$, followed by catalytic hydrogenation which also reduced the 3-cyano group to an aminomethyl group. Through diazotization of this amino group, the hydroxy methyl derivative is obtained and the 5-acetoxy group also converted to the 5-hydroxy group. It can be seen that, by the use of this synthesis, many interesting products, including pyridoxin, alpha and beta pyricin can be prepared with improved yields. A further advantage of the method of this invention is the fact that the synthesis can be accomplished with fewer steps than those required by conventional methods.

The following examples will serve to illustrate the invention, but it is understood that they in no way limit its scope.

*Example 1*

A few drops of piperidine were added to a solution of 2.1 gms. of cyanoacetamide in 25 ml. of warm alcohol and then 4 gms. of 3-acetoxy-2, 4-pentanedione were added. The solution was warmed for 30 minutes and then cooled. A precipitate of pyridone formed rapidly and was filtered off and washed with a little alcohol; M. P. 313° dec. Evaporation of the filtrate and cooling gave further fractions of pyridone which is moderately soluble in alcohol. The 4,6-dimethyl-5-acetoxy-3-cyano-2-pyridone was readily hydrolyzed to the 5-hydroxy compound.

Analysis of the acetoxy derivative:

Calc. for $C_{10}H_{10}O_3N_2$: 58.2% C, 4.85% H. Found, 58.4 C, 5.07 H.

Treatment of this pyridone with $PCl_5$ in $POCl_3$ or in chlorobenzene gives 4,6-dimethyl-5-acetoxy-3-cyano-2-chloro pyridine M. P. 246-7° without decomposition. Hydrogenation with palladium catalyst at 60° gives 4,6-dimethyl-5-acetoxy-3-aminomethyl pyridine which was not isolated in pure state but which was diazotized and hydrolyzed to give the known compound 4,6-dimethyl-5-hydroxy-3-hydroxymethyl pyridine isolated as the hydrochloride salt.

*Example 2*

A condensation run under identical conditions with 1-methoxy-3-acetoxy-2,4-pentanedione, prepared from the 3-chloro derivative and cyanoacetamide gave 6-methyl-5-acetoxy-4-methoxymethyl-3-cyano-2-pyridone M. P. 254-6°. By the same steps of chlorination, hydrogenation and diazotization the known compound pyridoxin-4-methyl ether was prepared.

*Example 3*

A few drops of piperidine were added to a solution of 4.5 gms. of 3-acetoxy-2,4-pentanedione and 3 gms. of ethyl cyano-acetate in 25 ml. of warm alcohol and the solution was then refluxed for one hour. After standing for 24 hours, the solution was concentrated and 25 ml. of concentrated ammonium hydroxide added. After standing for two days the solution was concentrated to a low volume and allowed to stand. The precipitate of 2,4-dimethyl-3-acetoxy-5-carboxamido-6-pyridone was filtered off and washed with water M. P. 345-6° dec.

Calc. for $C_{10}H_{12}O_4N_2$: 53.6% C, 5.36% H. Found, 53.1% C, 5.7% H.

*Example 4*

To a solution of 8.4 gms. of alpha acetoxy ethyl acetoacetate, $CH_3COCH(OOCCH_3)COOEt$ (B. P. 120-125°/20 mm.), and 3 gms. of sodium in 50 ml. of absolute alcohol, was added 4.2 gyms. of cyanoacetamide and the resulting solution was placed in a sealed tube and heated to 150° for 12 hours. The solution then contained a large precipitate. The solution was made neutral to litmus with concentrated HCl and a slight excess added. The alcohol was then largely evaporated off and 30 ml. of water added. The precipitate of 2-methyl-3,4,6-trihydroxy-5-cyano pyridine was filtered off M. P. 330° dec. The acetoxy group was hydrolyzed to the hydroxy group by the prolonged heating in the sealed tube which, after the condensation took place, contained sodium hydroxide in the alcohol.

Calc. for $C_7H_6O_3N_2$: 50.5% C, 3.6% H. Found, 50.0% C, 3.95% H.

*Example 5*

To a solution of 8.1 gms. of 3-chloro-2,4-pentanedione and 5 gms. of cyanoacetamide in 35 ml. of alcohol was added a few drops of piperidine and the solution refluxed for 12 hours. The solution was then evaporated nearly to dryness and cooled. The solid precipitate was filtered from a small amount of oil and alcohol. Fractional solution in a small amount of cold water left mainly the pyridone as a precipitate and took the cyanoacetamide into solution. Recrystallization from alcohol gave the product, 4,6-dimethyl-5-chloro-3-cyano-2-pyridone M. P. 279-80°. The structure of this compound was proven by a mixed melting point with the compound prepared by the action of sulfuryl chloride on 4,6-dimethyl-3-cyano-2-pyridone in benzene. This reaction proceeds rapidly and gives the 5-chloropyridone.

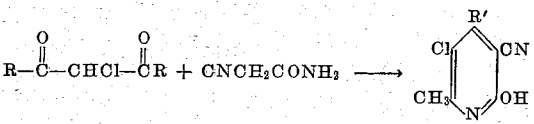

We claim:

1. 4,6-dimethyl-5-acetoxy-3-cyano-2-pyridone.
2. 4,6-dimethyl-5-hydroxy-3-cyano-2-pyridone.
3. 6-methyl-5-acetoxy-4-alkoxymethyl-3-cyano-2-pyridone.
4. A compound having the formula:

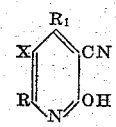

wherein R is an alkyl group, $R_1$ is a radical selected from the group consisting of alkyl and alkoxymethyl and X is a radical selected from the group consisting of hydroxyl and radicals readily hydrolyzable to a hydroxyl group.

5. The process for the preparation of a 5-hydroxy-3-hydroxymethyl pyridine having the formula:

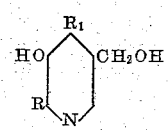

wherein R represents an alkyl group and $R_1$ is a radical selected from the group consisting of alkyl and alkoxymethyl, which comprises heating a 1,3-dicarbonyl compound having the formula $RCOCHXCOR_1$ wherein X is a substituent readily hydrolyzable to a hydroxyl group and R and $R_1$ have the significance above defined, with cyanoacetamide to form a 3-cyano-2-pyridone, treating said 2-pyridone with a solution of $PCl_5$ to form a 3-cyano-2-chloropyridine, hydrogenating said 2-chloropyridine, diazotizing the resulting 3-aminomethyl pyridine, hydrolyzing the reaction product and recovering said 5-hydroxy-3-hydroxymethyl pyridine.

6. The process for the preparation of 4,6-dialkyl 5-hydroxy-3-cyano-2-pyridone which comprises heating a 2,4-pentanedione having in the 3-position a radical readily hydrolyzable to a hydroxyl group, with cyanoacetamide in the presence of piperidine to form a 4,6-dialkyl-3-cyano-2-pyridone, hydrolyzing said 2-pyridone and recovering 4,6-dialkyl-5-hydroxy-3-cyano-2-pyridone.

7. The process for the preparation of a 4,6-dimethyl-5-acetoxy-3-cyano-2-pyridone which comprises heating 3-acetoxy-2,4-pentanedione with cyanoacetamide in the presence of piperidine and removing the precipitated 4,6-dimethyl-5-acetoxy-3-cyano-2-pyridone.

8. The process for the preparation of 6-methyl-4-alkoxymethyl-5-acetoxy-3-cyano-2-pyridone which comprises heating cyanoacetamide with 1-alkoxy-3-acetoxy-2,4-pentanedione in the presence of pyridine and recovering the resulting 6-methyl-4-alkoxymethyl-5-acetoxy-3-cyano-2-pyridone.

HARRY W. COOVER.
NORMAN J. BOWMAN.

REFERENCES CITED

The following references are of record in the file of this patent:

UNITED STATES PATENTS

| Number | Name | Date |
|---|---|---|
| 2,306,765 | Stiller | Dec. 29, 1942 |
| 2,372,690 | Stiller | Apr. 3, 1945 |